US006353768B1

(12) United States Patent
Karafillis et al.

(10) Patent No.: US 6,353,768 B1
(45) Date of Patent: Mar. 5, 2002

(54) METHOD AND APPARATUS FOR DESIGNING A MANUFACTURING PROCESS FOR SHEET METAL PARTS

(75) Inventors: Apostolos Pavlos Karafillis, Niskayuna; Michael Charles Ostrowski, Glenville; William Thomas Carter, Jr., Galway; Michael Evans Graham, Slingerlands, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/017,343

(22) Filed: Feb. 2, 1998

(51) Int. Cl.[7] ............................................... G06F 19/00
(52) U.S. Cl. .......................................... 700/97; 700/145
(58) Field of Search ........................... 700/97, 117, 145, 700/182, 206; 703/1, 2; 706/59

(56) References Cited

U.S. PATENT DOCUMENTS

| 5,379,227 A | * | 1/1995 | Tang et al. ................. 700/145 |
| 5,390,127 A | * | 2/1995 | Tang et al. ................. 700/145 |
| 5,463,558 A | * | 10/1995 | Tang et al. ................. 700/145 |
| 5,552,995 A | * | 9/1996 | Sebastian ..................... 700/97 |
| 5,561,754 A | * | 10/1996 | Oliver et al. ............... 395/141 |

OTHER PUBLICATIONS

Kjell Mattiasson et al., Simulation of Springback in Sheet Metal Forming, Simulation of Materials Processing: Theory, Methods and Applications 115–124 (1995).

Frederic Aberlenc et al., OPTRIS: The Complete Simulation of the Sheet Metal Forming, Simulation of Materials Processing: Theory, Methods and Applications 651–656 (1995).

B.D. Carleer et al., Modeling Drawbeads in 3D Finite Element Simulations of the Deep Drawing Process, Simulation of Materials Processing: Theory, Methods and Applications 681–685 (1995).

Y. Hayashida et al., FEM Analysis of Punch Stretching and Cup Drawing Tests for Aluminum Alloys Using a Planar Anisotropic Yield Function, Simulation of Materials Processing: Theory, Methods and Applications 717–722 (1995).

D. Joannic and J.C. Gelin, Accurate Simulation of Springback in 3D Sheet Metal Forming Processes, Simulation of Materials Processing: Theory, Methods and Applications 729–734 (1995).

(List continued on next page.)

*Primary Examiner*—Paul P. Gordon
(74) *Attorney, Agent, or Firm*—Noreen C. Johnson; Christian G. Cabou

(57) ABSTRACT

An exemplary method of designing a manufacturing process comprises the steps of representing a workpiece as a plurality of triangular finite elements, representing the forming tools with mathematical equations which typically include cubic polynomials, simulating a deformation of the workpiece by the forming tools with a finite element model, wherein the finite element model is integrated with explicit integration. The method may be carried out with an apparatus which includes a memory device which stores a program including computer readable instructions, and a processor which executes the instructions. After the deformation of the workpiece has been simulated by the finite element model, the characteristics of the workpiece and forming tools can be modified to improve the final shape of the workpiece. After the finite element simulation produces an acceptable final workpiece shape, an actual workpiece can be formed with actual tools based on the simulation.

20 Claims, 8 Drawing Sheets

OTHER PUBLICATIONS

M. El Mouatassim et al., An Industrial Finite Element Code for One-step Simulation of Sheet Metal Forming, Simulation of Materials Processing: Theory, Methods and Applications 761-766 (1995).

A.K. Ghosh and S.S. Hecker, Failure in Thin Sheets Stretched Over Rigid Punches, 6A Metallurgical Transactions 1065-1074 (1975).

A.P. Karafillis and M.C. Boyce, On the Modelling of Contact in Finite Element Analysis of Forming Processes, Numerical Methods in Industrial Forming Processes 267-273 (1992).

Harmon D. Nine, The Applicability of Coulomb's Friction Law to Drawbeads in Sheet Metal Forming, 2J. Appl. Metalw. 200-210 (1982).

M.C. Boyce and A.P. Karafillis, Tooling and Binder Design for 3D Sheet Metal Forming Processes Using Springback Calculations, Simulations of Materials Processing: Theory, Methods and Applications 581-586 (1995).

Amit K. Ghosh, A Method for Determining the Coefficient of Friction in Punch Stretching of Sheet Metals, 19 Int. J. Mech. Sci. 457-470 (1977).

A.K. Ghosh and S.S. Hecker, Stretching Limits in Sheet Metals: In-Plane versus Out-of-Plane Deformation, 5 Metallurgical Transactions 2161-2164 (1974).

S.P. Keeler and W.A. Backofen, Plastic Instability and Fracture in Sherets Stretched Over Rigid Punches, 56 Transactions of the ASM 25-48 (1963).

R. Hill, The Mathematical Theory of Plasticity, iv, vii-ix, 282-340 (1950).

ABAQUS/Standard Version 5.7 User's Manual vol. III, Hibbit, Karlsson & Sorensen, Inc. 25.1.1-1 through 25.1.1-5; 25.2.15-1 through 25.2.15-10 (1997).

ABAQUS/Explicit Version 5.6 User's Manual vol. 1, Hibbit, Karlsson & Sorensen, Inc. 1.1.2-1 through 1.3.1-4; 6.2.1-1 through 6.2.1-1 through 6.2.1-14 (1996).

* cited by examiner

METHOD AND APPARATUS FOR
DESIGNING A MANUFACTURING PROCESS
FOR SHEET METAL PARTS

BACKGROUND

1. Field of the Invention

The present invention relates generally to sheet metal forming, and more particularly to a method and apparatus for designing the manufacturing process for making sheet metal parts.

2. Description of the Related Art

The task of designing the manufacturing process for making sheet metal parts can be very time consuming and expensive. The tooling design is typically decomposed into a number of operations and die shapes needed to produce the desired part. In parallel, the manufacturing process parameters, such as the initial shape of the blank, the blankholder force, and the shape of the drawbeads are also defined. Additionally, the design cycle must account for a number of potential defects, such as tearing of the sheet metal, excessive thinning or thickening of the part, insufficient flange remaining following the forming operation, and incorrect final part shape.

Fortunately, the time and expense incurred in designing the manufacturing process can be significantly reduced by accurately simulating the forming processes before committing to hard tooling. For example, a simulation program know as ABAQUS has been developed by Hibbit, Karlsson & Sorensen, Inc. of Pawtucket, R.I. to model deformation processes and predict some sheet metal forming defects such as tearing and springback. The outcome of a simulation performed using ABAQUS can be used to select the forming parameters and design the die shapes of a forming process.

However, ABAQUS has some significant drawbacks. For example, in the "Explicit" version which utilizes explicit integration, the forming tools for 3-dimensional analysis are defined by a finite element mesh. The construction of such a mesh for the forming tools is usually very time consuming in terms of both human and computer resources. In addition, the finite element mesh involves approximating the actual shape of the tools as a mesh of triangular facets or bilinear four-node elements, which compromises the accuracy of the results.

ABAQUS also has a "standard/implicit" version which utilizes implicit integration and which allows the user to input the shape of the forming tools as either a finite element mesh or an exact mathematical model. However, the exact mathematical model must be in a unique ABAQUS format, which is typically very time consuming to construct.

Anther shortcoming of ABAQUS relates to the effort required to model drawbeads. In the case that drawbeads are used, the only direct way of implementing them into the model is by a complete representation of their detailed geometry as part of a large three-dimensional tool, thereby increasing the amount of human and computer resources required to conduct the analysis.

It would be desirable, therefore, to have a method and apparatus for modeling a manufacturing process such as sheet metal forming which provided accurate results by allowing exact mathematical modeling of the forming tools, while reducing the human and computer resources needed to conduct the simulation.

SUMMARY

A method of designing a manufacturing process, according to an exemplary embodiment of the invention, comprises the steps of representing a workpiece as a plurality of finite elements, representing a forming tool with a mathematical equation, simulating a deformation of the workpiece by the forming tool with a finite element model, wherein the finite element model is integrated with explicit integration, and adjusting a characteristic of at least one of the workpiece and the forming tool to alter a final shape of the workpiece. The method may be carried out with an apparatus which includes a memory device which stores a program including computer readable instructions and a processor which executes the program instructions in accordance with the method.

After the deformation of the workpiece has been simulated by the finite element model, the characteristics of the workpiece and forming tool can be modified to improve the final shape of the workpiece. For example, the user can modify forming parameters such as the punch travel distance, the blankholder load, the speed of the forming process, and the coefficients of friction for the forming tool. The user can also modify the shape of the workpiece, the shape of the forming tool including drawbeads, and the material of the workpiece, to improve the final shape of the workpiece. After the finite element simulation produces an acceptable final workpiece shape, an actual workpiece can be formed with actual tools based on the simulation.

The invention also relates to an article of manufacture comprising a memory device such as a compact disc containing computer readable program instructions embodied therein for designing a manufacturing process.

BRIEF DESCRIPTION OF THE DRAWINGS

Other features and advantages of the invention will be more readily understood upon reading the following detailed description in conjunction with the drawings, in which.

DETAILED DESCRIPTION OF THE PREFERRED EMBODIMENTS

Figure 1:
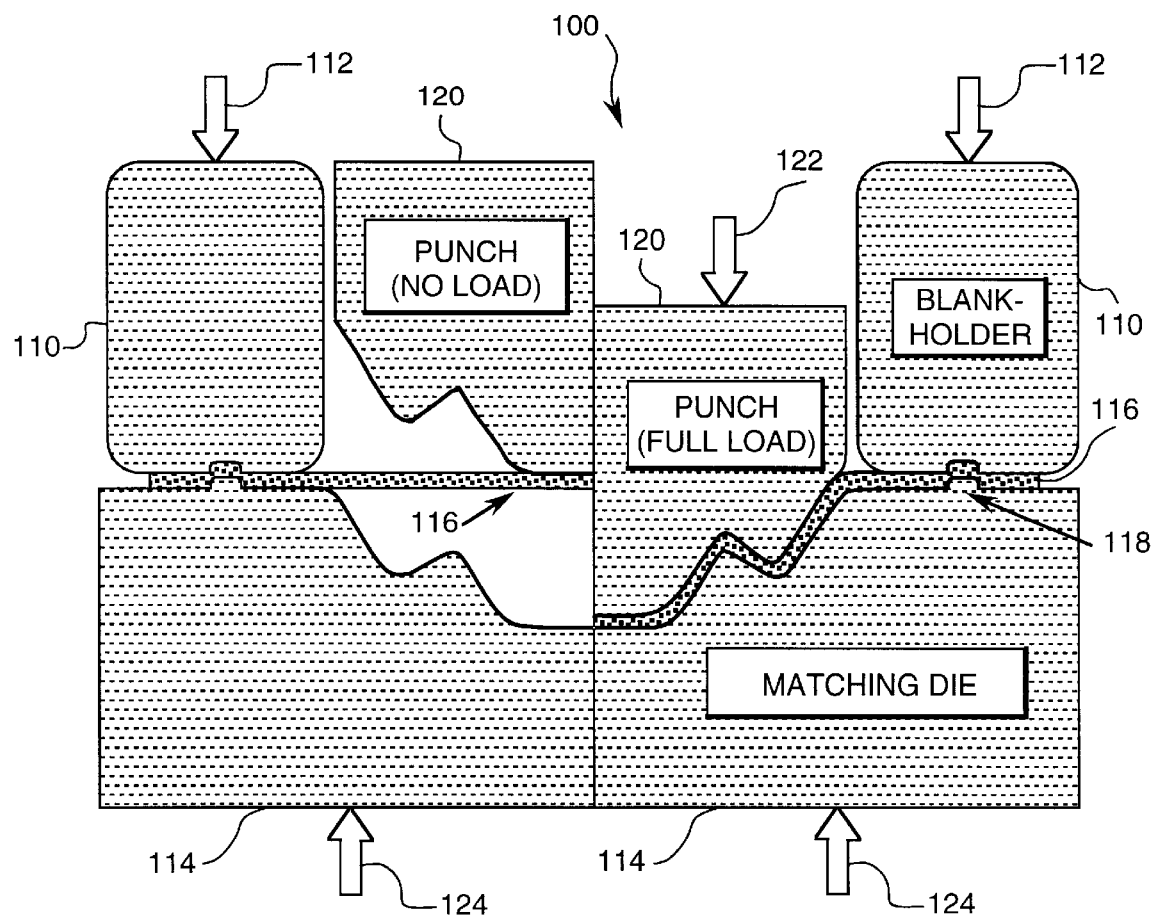
FIG. 1 is a drawing of an exemplary sheet metal forming apparatus.

FIG. 1 illustrates a typical sheet metal forming apparatus. The apparatus 100 includes a blankholder 110 to which a load represented by arrow 112 is applied. The blankholder 110 is pushed against a die 114 to secure the workpiece 116 in place. The die 114 typically includes a drawbead 118 which restrains the workpiece during formation of the workpiece. The apparatus 100 also includes at least one punch 120, to which a load is applied represented by arrow 122. The punch 120 shapes the workpiece 116 when the load 122 is applied, as shown on the right side of FIG. 1. Arrows 124 represent the reaction force required to support the die 114. The blankholder 110, die 114, and punch 120 are collectively known as "forming tools".

Figure 2:
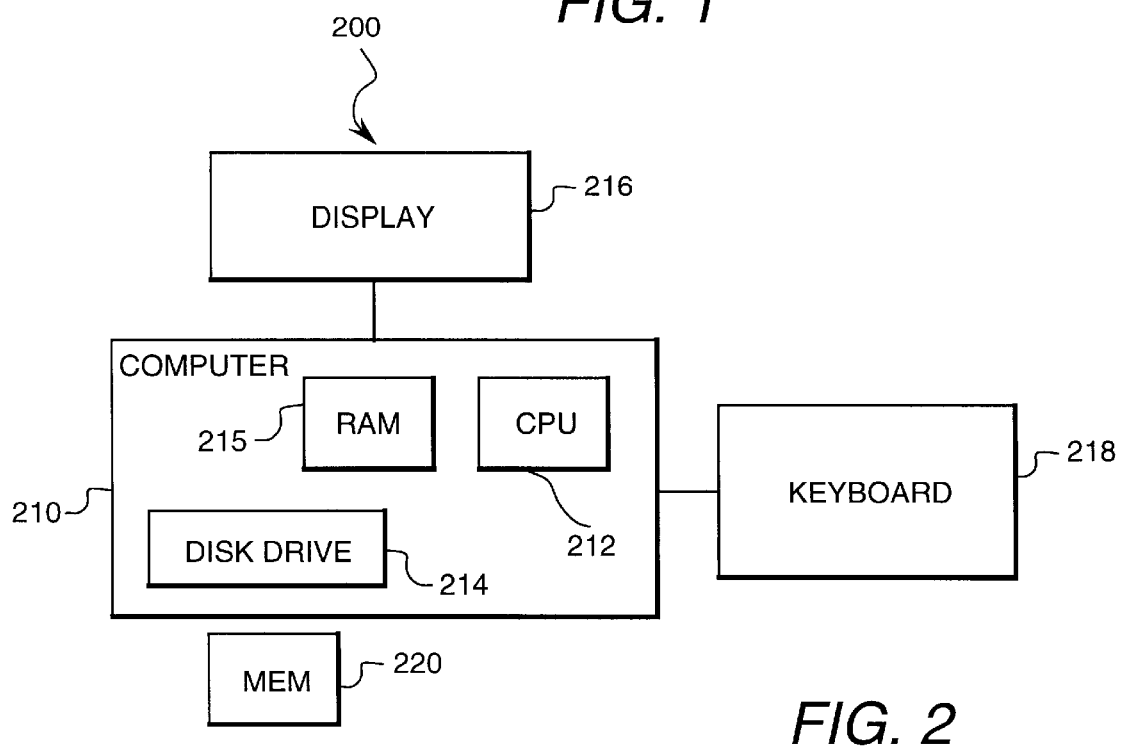
FIG. 2 is a drawing of an apparatus and article of manufacture for designing a manufacturing process according to an exemplary embodiment of the invention.

FIG. 2 illustrates an apparatus for designing a manufacturing process according to an exemplary embodiment of the invention. The apparatus 200 comprises a computer 210 which includes a CPU 212 which reads computer readable program code. The computer readable program code is typically contained in an article of manufacture comprising a computer useable medium 220 such as a floppy disk, hard disk, compact disk, or other storage medium or memory device. The computer useable medium 220 includes electromagnetically fixed computer readable instructions for execution of a method which will be described below according to exemplary embodiments of the invention. The computer 210 includes a disk drive 214 or other device for reading the computer useable medium 220. During execution of the program, the computer readable program code may be stored in Random Access Memory 215. A display 216 and keyboard 218 allow information to be exchanged between a user and the computer 210.

Figure 3:
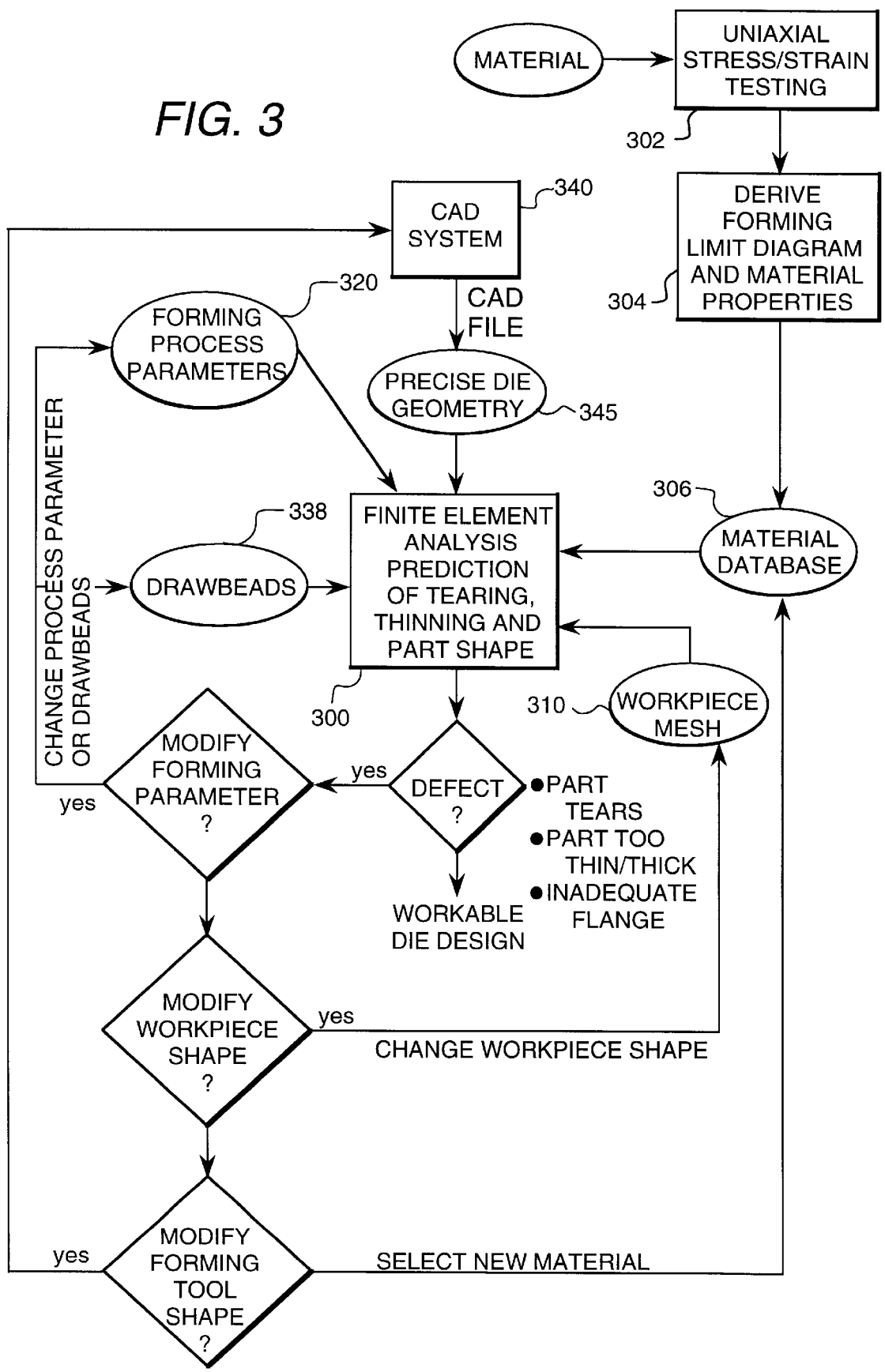
FIG. 3 is flow chart depicting a method according to an exemplary embodiment of the invention.

FIG. 3 is a flow chart which illustrates a method of designing a manufacturing process according to an exemplary embodiment of the invention. At the center of the flow chart is a finite element model (FEM) 300 which models the behavior of the workpiece 116 based on various inputs. The finite element model, according to a preferred embodiment, is a dynamic model which uses explicit integration. The dynamic explicit method is an incremental method in which the forming tools move in time increments toward their final positions at the completion of the forming process. The workpiece 116 is modeled as a mesh of triangular membrane elements defined by nodes. The workpiece nodal positions, velocities and accelerations are calculated at each time increment. The strains and stresses in the workpiece 116 are computed at each time increment by the positions of the nodes of the workpiece mesh.

The inputs to the finite element model 300, which typically include material properties of the workpiece 166, the workpiece model, the drawbead model, the precise geometrical model of the forming tools, a friction model, and the sheet metal forming process parameters will now be described.

In FIG. 3, blocks 302 and 304 relate to the material properties of the workpiece 116. In block 302, the workpiece material is subject to a uniaxial stress/strain test, in which the stress and strain on a sample of the metal are measured as a force is applied to the sample in one direction. Typically, the stress/strain test conforms to the ASTM E8 standard. The stress/strain test provides data in the form of true stress v. true strain and the normal anisotropy ratio. Conventionally, true stress is defined as force divided by the current area. True strain is defined as $\ln(l/l_0)$ where l is the final length and $l_0$ is the initial length. The normal anisotropy ratio is defined as the ratio of the transverse to the through-thickness strain.

Figure 4:
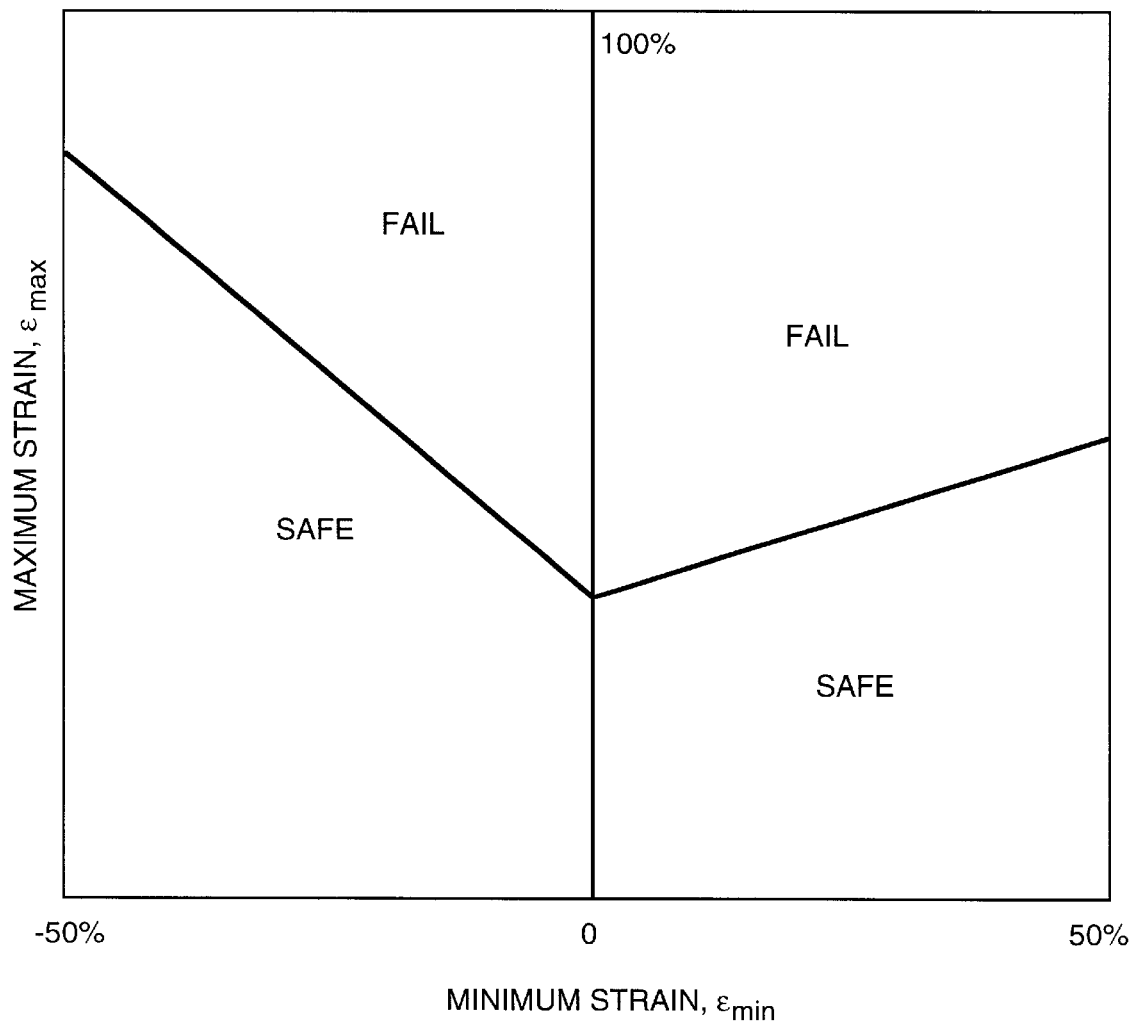
FIG. 4 is an example of a forming limit diagram.

In block 304, the workpiece is subject to a formability test. A preferred formability test, as described in S. P. Keeler and W. A. Backofen, *Plastic Instability and Fracture in Sheets Stretched over Rigid Punches*, 56 Transactions of the ASM 25-49 (1963) involves stretching a number of metal sheets, having varying widths and degrees of lubrication, with a rigid spherical punch to the point of failure. The point of failure for each metal sheet is then plotted in terms of maximum and minimum strain to produce a forming limit diagram, an example of which is shown in FIG. 4. The forming limit diagram defines the membrane strain fields where failure of a sheet metal part by tearing will or will not occur.

After obtaining the material data in blocks 302 and 304, the data is stored in a material database, as shown in block 306. The data stored in the material database is input to the finite element model 300 which uses the data and stress/strain equations to relate the deformation of the workpiece to the forces applied to the workpiece 116.

The workpiece 116 is defined as a membrane comprising a mesh of triangular elements, according to an exemplary embodiment of the invention. The membrane models a surface which runs through the middle point across the thickness of the workpiece. Each element is associated with a thickness that can change during the formation process. Each triangular element is defined by three nodes. Each node is defined by position coordinates. The mesh is typically constructed with the well known Delaunay triangulation method. During the simulation of the forming process, the displacement, velocity, and acceleration of each node is monitored and recorded. A force, such as from friction, is applied to the node as an acceleration calculated with Newton's second law and the appropriate mass. Based on this data, the stresses and strains on each triangular element, as well as the thickness of each element are calculated.

In block 320, the parameters which define the desired sheet metal forming process are defined and input to the finite element model 300. According to one embodiment, the process parameters include the punch travel distance, the blankholder load, the speed of the forming process, and the coefficients of friction for the forming tools.

In block 330 of FIG. 3, the drawbead 118 and its effect on the sheet metal forming process may be modeled. Initially, the effect produced by the drawbead 118, e.g. the restraining force $F_R$, the normal force $F_N$, and the thinning strain, on the workpiece 116 is determined. The restraining force $F_R$ is defined as the force required to pull the workpiece material out of a fully clamped drawbead. The normal force $F_N$ is defined as the force required to clamp down the drawbead and keep it closed during the material sliding. The thinning strain is defined as the greatest change in thickness of the workpiece, which is typically located at the drawbead exit.

Figure 5:
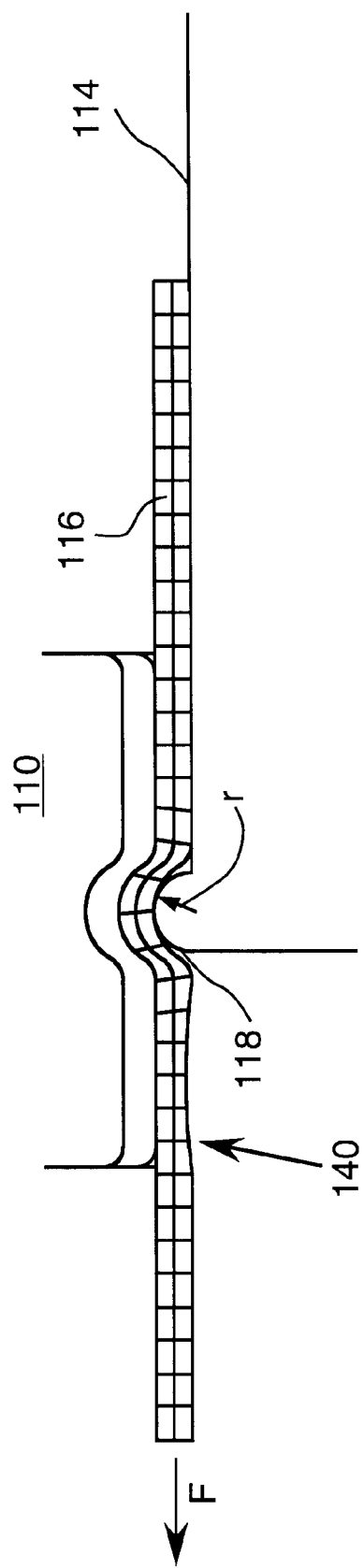
FIG. 5 is a drawing which depicts the modeling of a drawbead.

Determination of the effect of the drawbead may be accomplished by simulating the application of a force F, as shown in FIG. 5, applied to the workpiece 116 to pull the workpiece 116 between the drawbead 118 and the blankholder 112. In this simulation, the shape of the drawbead 118 is defined in terms of its radius "r", and the workpiece 116 is defined by a plurality of finite elements, a thickness "t", and its material properties. This simulation process is described, for example, in A. P. Karafillis and M. C. Boyce, *On the Modeling of Contact in Finite Element Analysis of Forming Parameters*, Numerical Methods in Industrial Forming Processes, 267– 273 (1992), which is hereby incorporated by reference. The simulation yields the restraining force $F_R$, the normal force $F_N$ of the blankholder 110, and the maximum thinning strain of the workpiece 116, which is typically located at the exit 140 of the drawbead 118, as shown in FIG. 5.

Figure 6:
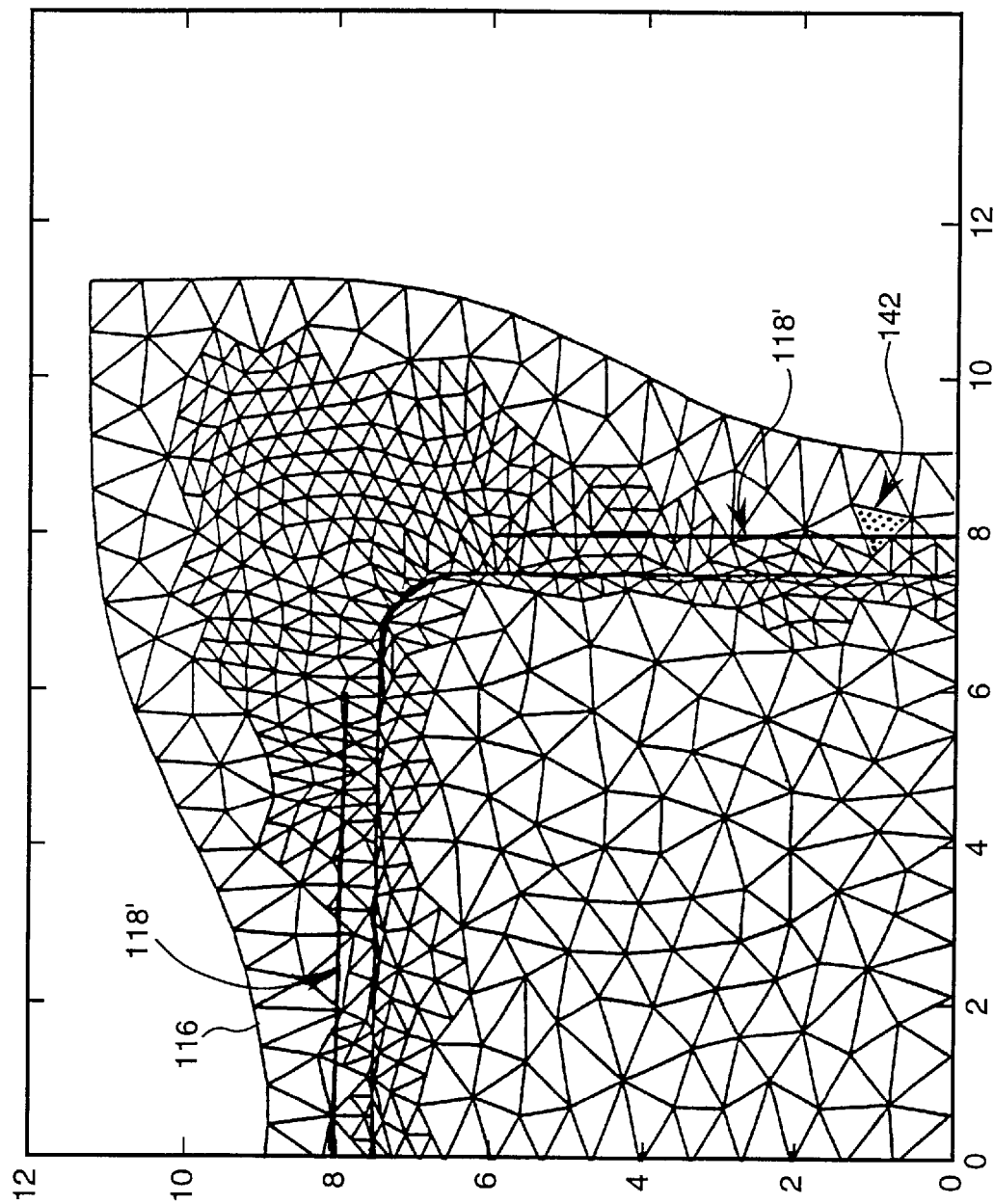
FIG. 6 shows an example of triangular mesh elements of a workpiece.

After the drawbead restraining force $F_R$ and normal force $F_N$ have been determined for the material and drawbead in question, they are incorporated into the finite element model 300. FIG. 6 illustrates an example of one quarter of a workpiece mesh of triangular elements and two lines 118' which each represent drawbeads. The line 118' is located in the geometric center of the drawbead. Although the lines 118' in FIG. 6 are both straight, they may also be curved to model a nonlinear drawbead.

The effect of the drawbead during the forming process is modeled on an element by element basis. First, the computer 210 determines which elements the line 118' crosses. For example, the computer would determine that the line 118' crosses the element marked 142 (as well as many other elements) in FIG. 6. Next, the length of the line 118' across the element 142 is determined and multiplied by the restraining force per unit length of the line 118' to get the restraining force applied to element 142. This restraining force is then distributed equally (in thirds) and applied to each node of element 142.

The drawbead restraining force, normal force, and thinning strain at the drawbead exit have been found to be a function of the workpiece material and the drawbead geometry. The drawbead restraining force, normal force, and thinning strain can thus be determined by these parameters, without modeling the process of pulling the workpiece across the drawbead in each case. Preferably, the process of modeling the pulling of the workpiece across the drawbead is conducted initially for a number of values of the ratio t/r for all materials of interest, where t is the thickness of the workpiece sheet and r is the drawbead radius. For each value of t/r for a particular workpiece material, the restraining force, normal force, and thinning strain are obtained and plotted, as shown in FIGS. 7, 8, and 9.

Figure 7:
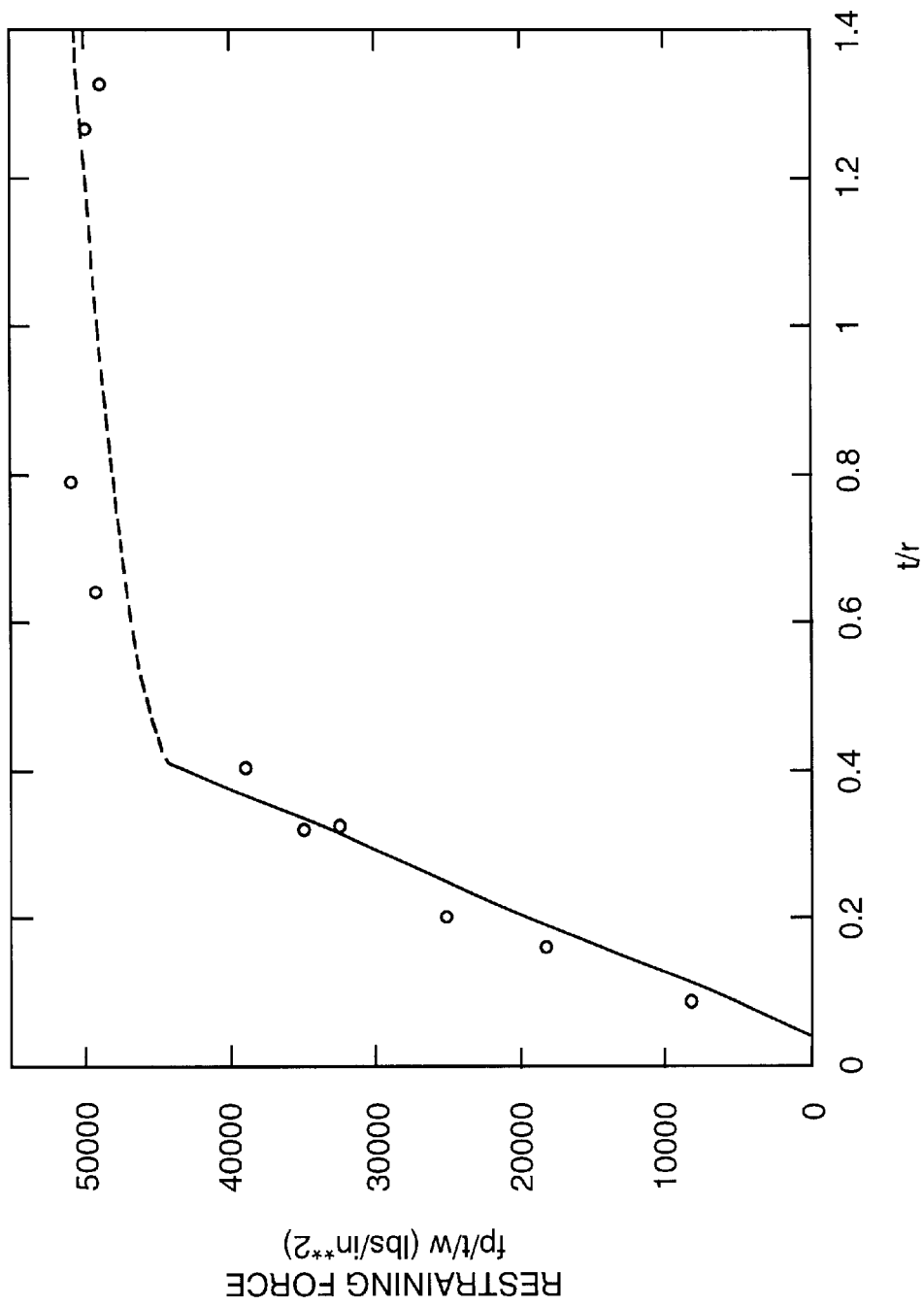
FIG. 7 is a graph of a restraining force as a function of the workpiece thickness and drawbead radius.
Figure 8:
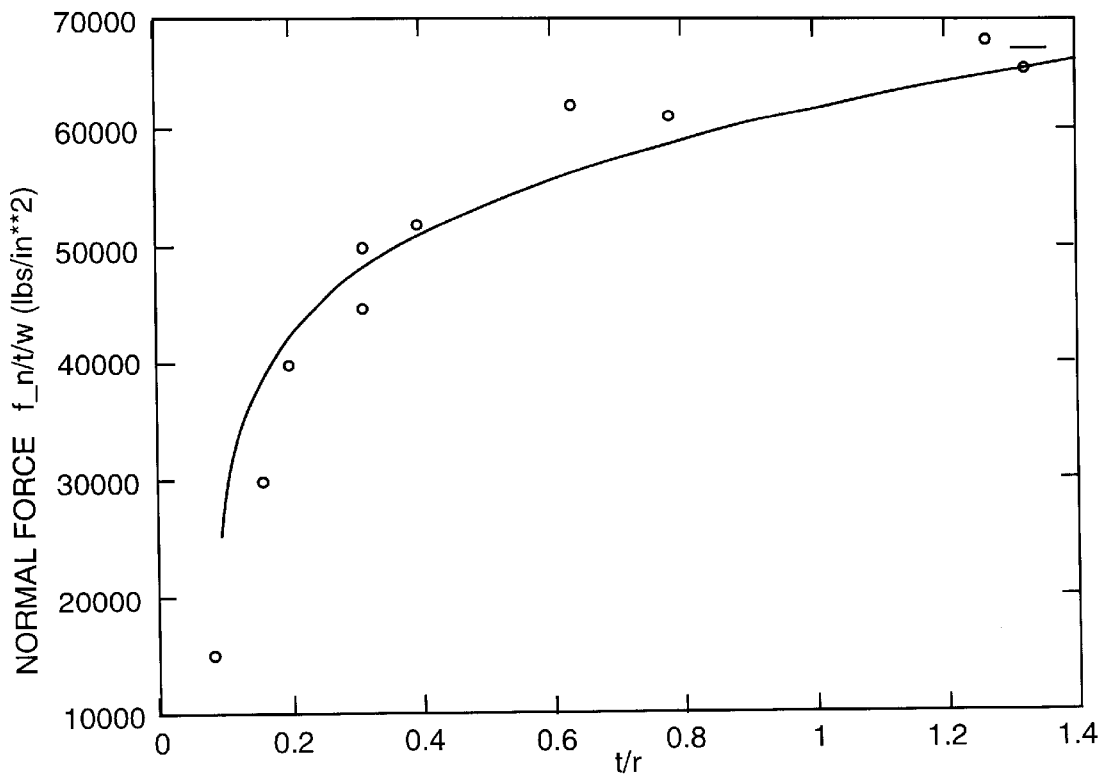
FIG. 8 is a graph of a normal force as a function of the workpiece thickness and drawbead radius.
Figure 9:
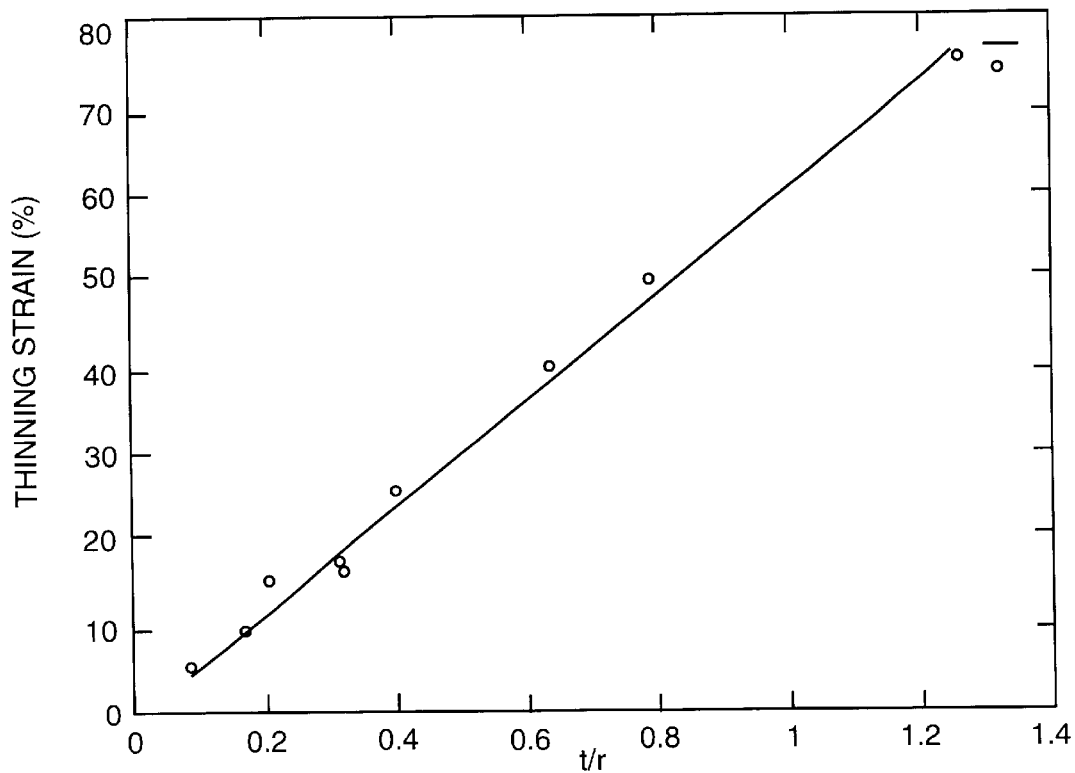
FIG. 9 is a graph of thinning strain as a function of the workpiece thickness and drawbead radius.

Subsequent modeling of the sheet metal forming process then involves a determination of restraining force, normal force and thinning strain from the graphs in FIGS. 7–9 based on the drawbead radius r, the workpiece thickness t, and the workpiece material. The restraining and normal forces are incorporated into the finite element model, as discussed above. The thinning strain is typically used as a drawbead selection criterion, to select initial values of "t" and "r", based on a minimum acceptable value of the thinning strain, for example. The thinning strain is typically not used in the finite element modeling of the sheet metal forming process.

In block 340 of FIG. 3, the geometries of the forming tools, including the blankholder 110, the die 114, and the punch 120, are defined. Typically, a computer aided design (CAD) system, such as the Unigraphics program produced by Electronic Data Systems (EDS) Corporation, Unigraphics Division or the Pro/Engineer program of Parametric Technology Corporation is used to define the precise, curved surfaces and solid geometries of the forming tools. According to a preferred embodiment, the process of defining the surfaces and curves of the forming tools involves describing the forming tools with polynomial representations, such as cubic polynomials. The polynomial representations are used in exact mathematical equations describing the surfaces and curves of the forming tools. Because the surfaces and curves are described with polynomials, it is not necessary to go through the time consuming process of forming a finite element mesh to represent the shape of the forming tools.

The CAD system, after determining the equations representing the forming tools, converts the equations into an industry standard data exchange format, such as IGES (Initial Graphics Exchange Specification). The IGES file contains, among other things, mathematical coefficients for the underlying curves and surfaces as well as boundary information for trimmed surfaces.

Figure 10:
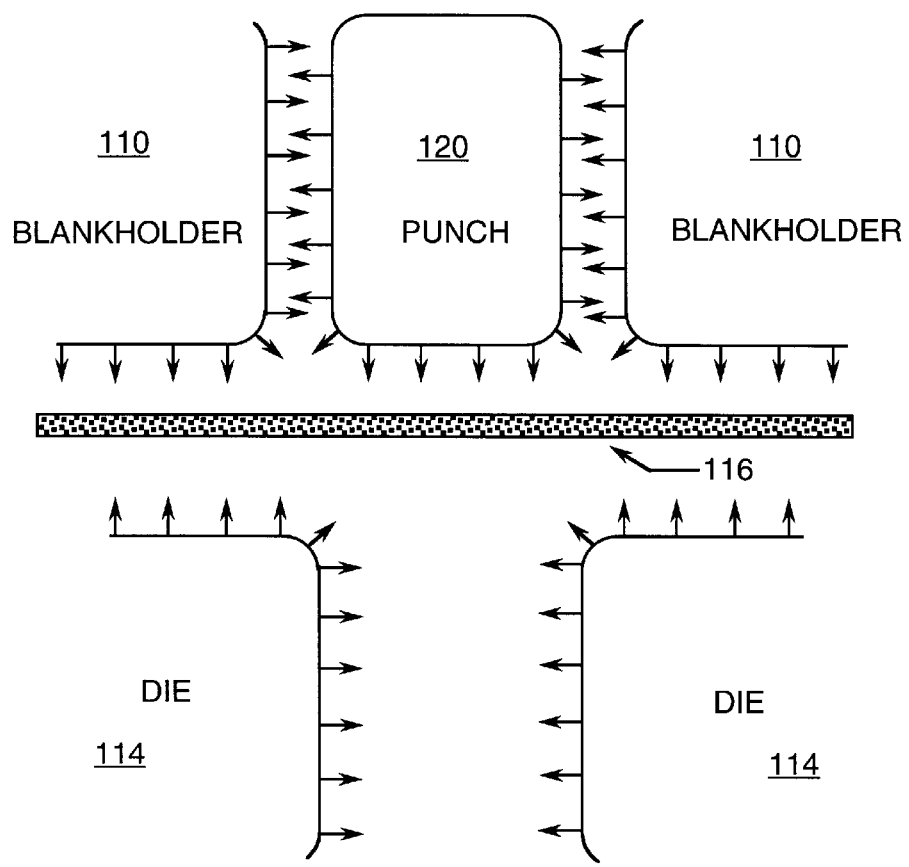
FIG. 10 is a diagram which illustrates the orientation of the surface normals of the forming tools with respect to the workpiece.

In block 345, after the curves and surfaces of the forming tools have been defined and specified in the IGES or other standard CAD file, a normal vector, normal to each tool surface and pointing toward the workpiece 116, is determined. As shown in FIG. 10, the normal vectors define the outside surfaces of the forming tools and are utilized to ensure that the workpiece 116 remains on the outside of the forming tools throughout the sheet metal forming simulation.

The finite element model 300, according to a preferred embodiment, is a dynamic explicit model which uses explicit integration. At each time increment, the forming tools move toward their positions at the completion of the forming process. The workpiece nodal positions, velocities and accelerations are calculated at each time increment. The strains and stresses in the workpiece are computed by the positions of the nodes of the workpiece mesh.

Where a node of the workpiece mesh slides over the forming tools, a friction force is calculated using an appropriate friction model, for example where the force of friction is proportional to the normal force.

Forces arising from the drawbead are also modeled in the finite element analysis. The drawbead line 118' is tested at each time increment against the triangular elements of the workpiece for contact and force computation. The calculated restraining force is applied to the nodes defining the element.

The drawbead normal force is used to calculate the fractions of the blankholder force assigned to drawbead clamping and to pressure flange clamping, respectively. First, the normal force on the drawbead is subtracted from the total force applied to the blankholder, to give the force on the flange. The flange force is then distributed to each node on the flange according to the area surrounding the node. After the flange force has been distributed appropriately to the flange nodes, a friction force for each node on the flange can be calculated using an appropriate friction model which relates normal force to friction force. The friction force, which acts as a restraining force, is then applied to each node on the flange to model the friction between the workpiece flange and the blankholder.

It is typical for such an analysis to require over 10,000 time increments. The time increment taken typically cannot exceed a specified stability limit, which is equal to the time required for a dilatational elastic wave to run across the shortest element of the workpiece mesh.

The finite element analysis calculations are implemented in conjunction with a contact checking routine which enforces contact boundary conditions between the workpiece and the forming tools. The contact boundary conditions are enforced by performing periodic contact checks at a preselected frequency (e.g. number of contact checks per simulation) to ensure that the workpiece nodes do not penetrate the forming tools at any time during the simulation. If a workpiece node is found to have penetrated the forming tools after a contact check is performed, this node is relocated to the surface of the forming tool by the end of the time interval between two contact checks. The number of contact checks is typically smaller than the number of time increments, e.g. 100 contact checks per simulation, which expedites the integration. The contact checking routine utilizes geometric operations such as rigid body transformations, calculation of minimum distance between a point and a surface, parametric evaluation, parametric inversion, and inside/outside loop testing.

Figure 11:
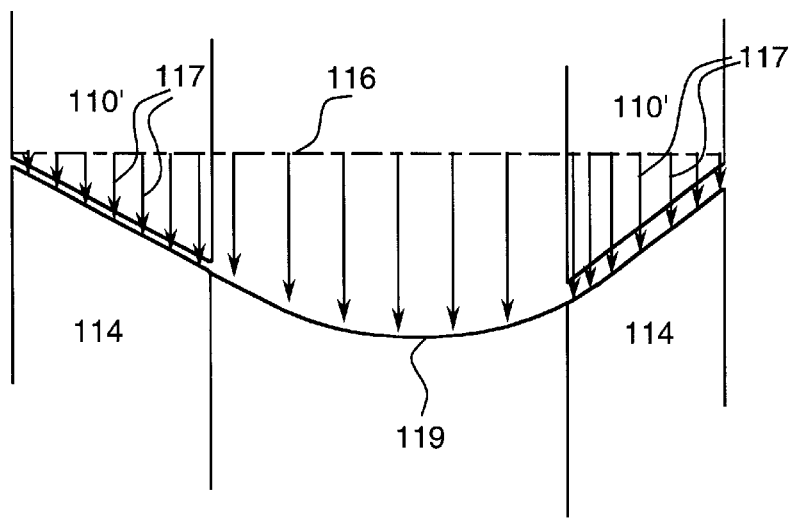
FIG. 11 is a diagram which illustrates the modeling of the preforming of the workpiece.

In the case that the workpiece must be bent initially to fit into the blankholder, for example if the blankholder surface is curved, the initial preforming step of installing a flat workpiece in the blankholder can be modeled. As shown in FIG. 11, the modeling entails projecting the nodes of the flat, horizontal workpiece 116 vertically onto the curved blankholder surface. This projection is indicated by arrows 117. The area between the dies 114 can be represented with a curve 119 such as a parabola for the purpose of projecting the workpiece nodes. After projecting the nodes vertically onto the blankholder surface and curve 119, the total length and area of the workpiece 116 has increased. To avoid making membrane stress and strain calculations, a scaling factor is determined which is the ratio of the length of the original workpiece to the length of the workpiece after it has been projected onto the blankholder. The next step involves scaling down the length of the original flat horizontal workpiece by the scaling factor, which results in moving the ends of the workpiece horizontally toward each other. The shortened workpiece is then projected vertically again onto the blankholder. The resulting workpiece after the second projection has a length and area which is about the same as the length and area of the original workpiece, so that stresses and strains can be safely neglected.

According to a preferred embodiment, the computer generates a file at the end of the finite element analysis containing node coordinates, finite element connectivity, element state variables including true stress and plastic equivalent strain, element thicknesses, and the punch force required to form the part. This file can be used for illustrating the deformed workpiece and the element state variables on the display 216. This illustration can be accomplished by using the file generated by the finite element analysis simulation 300 and a conventional program appropriate for creating visual representations of finite element analysis results, such as Hypermesh of Altair Computing Inc.

The computer may also be programmed to generate various messages relating to the forming process, such as whether the workpiece has been torn, whether the workpiece is too thin or thick, and whether there is inadequate flange remaining. This file containing the final workpiece state can be used as an input without modification to a subsequent finite element method forming simulation, which facilitates the modeling of multi-step forming operations. Intermediate anneals can be modeled by assigning a value of zero to all state variables prior to the simulation of the subsequent forming operations.

Determination of the final workpiece state allows a user to adjust a characteristics of the workpiece or forming tools to improve the manufacturing process. For example, as shown in FIG. 3, the user can modify forming parameters such as the punch travel distance, the blankholder load, the speed of the forming process, and the coefficients of friction for the forming tools. The user can also modify the shape of the workpiece, the shape of the forming tools including the drawbeads, and the material of the workpiece, to improve the final shape of the workpiece. After the finite element simulation produces an acceptable final workpiece shape, an actual workpiece can be formed with actual tools based on the simulation.

Although the invention has been described with reference to particular embodiments, those skilled in the art will recognize that various modifications can be made without departing from the spirit of the invention, as defined in the following claims.

What is claimed is:

1. A method of designing a manufacturing process, the method comprising the steps of:

representing a workpiece as a plurality of finite elements;

representing a forming tool with a mathematical equation;

simulating a deformation of the workpiece by the forming tool with a finite element model, wherein the finite element model is integrated with explicit integration; and adjusting a characteristic of at least one of the workpiece and the forming tool to alter a final shape of the workpiece.

2. The method of claim 1, further comprising the step of forming an actual workpiece with an actual forming tool based on the simulation.

3. The method of claim 1, wherein the characteristic comprises at least one of: a drawbead shape, a shape of the forming tool, a shape of the workpiece, a material of the workpiece, a travel distance of the forming tool, a speed of the deformation, and a friction force caused by the forming tool.

4. The method of claim 1, wherein the mathematical equation includes a polynomial.

5. The method of claim 1, wherein the forming tool comprises at least one of a die, a punch, and a blankholder.

6. The method of claim 1, wherein the forming tool comprises a drawbead, and the method further comprises the steps of:

representing the drawbead as a line; and applying a restraining force to a node of one of the finite elements based on the length of the line across said one of the finite elements.

7. The method of claim 1, wherein the step of representing the forming tool with a mathematical equation comprises generating a standardized CAD file.

8. The method of claim 7, wherein the standardized CAD file comprises an Initial Graphics Exchange Specification file.

9. The method of claim 1, wherein the finite elements comprise a mesh of triangular elements.

10. The method of claim 1, further comprising the step of determining, at a frequency which is less than each time step of the integration, whether the workpiece has contacted the forming tool.

11. The method of claim 10, wherein the step of determining whether the workpiece has contacted the forming tool comprises a determination as to whether a node of one of the finite elements has penetrated the forming tool.

12. The method of claim 11, further comprising the step of orienting a normal vector from a surface of the forming tool to point toward the workpiece.

13. The method of claim 1, further comprising the step of:

projecting nodes of the finite elements onto the forming tool to model a preforming step.

14. A method of modeling a sheet metal forming process, the method comprising the steps of:

representing a sheet metal workpiece as a plurality of finite elements;

representing a forming tool with a mathematical equation; and simulating a deformation of the sheet metal workpiece by the forming tool with a finite element model, wherein the finite element model is integrated with explicit integration.

15. An apparatus for modeling a manufacturing process, the apparatus comprising:

a memory device which stores a program including computer readable instructions; and a processor which, following the program instructions, represents a workpiece as a plurality of finite elements; represents a forming tool with a mathematical equation; and simulates a deformation of the workpiece by the forming tool with a finite element model, wherein the finite element model is integrated with explicit integration.

16. The apparatus of claim 15, wherein the memory device comprises random access memory.

17. A method of modeling a manufacturing process comprising the steps of:

representing a drawbead on a forming tool as a line;

determining whether the line intersects a finite element representing a workpiece.

assigning a restraining force to a node of the finite element based on the length of the line intersecting the finite element.

18. The method of claim 17, wherein the force is based on a ratio of the thickness of the workpiece to the radius of the drawbead.

19. An article of manufacture comprising:

a memory device containing computer readable program code means embodied therein for designing a manufacturing process, the computer readable program code means in the article of manufacture comprising:

first computer readable program code means for representing a workpiece as a plurality of finite elements;

second computer readable program code means for representing a forming tool with a mathematical equation; and third computer readable program code means for simulating a deformation of the workpiece by the forming tool with a finite element model, wherein the finite element model is integrated with explicit integration.

20. The article of manufacture of claim 19, wherein the memory device comprises at least one of: a floppy disk and a compact disk.

* * * * *